US011988981B2

(12) United States Patent
Kubo et al.

(10) Patent No.: US 11,988,981 B2
(45) Date of Patent: May 21, 2024

(54) ENDLESS BELT, TRANSFER DEVICE, AND IMAGE FORMING APPARATUS

(71) Applicant: FUJIFILM Business Innovation Corp., Tokyo (JP)

(72) Inventors: Yosuke Kubo, Kanagawa (JP); Hiroaki Tanaka, Kanagawa (JP); Shigeru Fukuda, Kanagawa (JP); Daisuke Tanemura, Kanagawa (JP); Masato Ono, Kanagawa (JP); Masato Furukawa, Kanagawa (JP); Masayuki Seko, Kanagawa (JP); Koichi Matsumoto, Kanagawa (JP); Iori Nishimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/190,113

(22) Filed: Mar. 26, 2023

(65) Prior Publication Data

US 2024/0118647 A1 Apr. 11, 2024

(30) Foreign Application Priority Data

Sep. 26, 2022 (JP) ................................ 2022-153019

(51) Int. Cl.
*G03G 15/16* (2006.01)

(52) U.S. Cl.
CPC ... *G03G 15/162* (2013.01); *G03G 2215/0129* (2013.01)

(58) Field of Classification Search
CPC ............ G03G 15/1605; G03G 15/162; G03G 2215/0129
See application file for complete search history.

(56) References Cited

U.S. PATENT DOCUMENTS

| | | | | |
|---|---|---|---|---|
| 10,551,770 | B1 * | 2/2020 | Seko | G03G 15/162 |
| 2010/0226697 | A1 * | 9/2010 | Ogino | G03G 15/1605 399/308 |
| 2021/0080874 | A1 * | 3/2021 | Ikeda | G03G 15/162 |

FOREIGN PATENT DOCUMENTS

| | | |
|---|---|---|
| JP | 2004075753 | 3/2004 |
| JP | 6828504 | 2/2021 |

* cited by examiner

*Primary Examiner* — Sophia S Chen
(74) *Attorney, Agent, or Firm* — JCIPRNET

(57) ABSTRACT

An endless belt includes a resin and conductive particles, in which a content of the conductive particles with respect to the endless belt is 5% by volume or more and 20% by volume or less in terms of a volume ratio, a Young's modulus of the endless belt is 3,000 MPa or more, and the number of times of bending endurance of the endless belt measured by an MIT test specified in JIS P8115:2001 is 10,000 or more.

20 Claims, 2 Drawing Sheets

ENDLESS BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-153019 filed Sep. 26, 2022.

BACKGROUND

(i) Technical Field

The present invention relates to an endless belt, a transfer device, and an image forming apparatus.

(ii) Related Art

In an image forming apparatus (such as a copy machine, a facsimile machine, or a printer) using an electrophotographic method, a toner image formed on the surface of an image holder is transferred to the surface of a recording medium and fixed on the recording medium such that an image is formed. For the transfer of the toner image to the recording medium, for example, an intermediate transfer belt is used. Various endless belts, such as a transport belt, are used not only in the image forming apparatus, but also in other apparatuses.

For example, JP6828504B discloses "a cylindrical member for an image forming apparatus having a polyamide-imide resin layer containing a polyamide-imide resin and a urea-based solvent, in which in an SN curve obtained from the number of times of folding endurance measured by the method based on JIS-P8115 (2001) by using an MIT tester while varying only a radius of curvature of a folding clamp to 0.38 mm, 1.0 mm, and 2.0 mm, the number of times of folding endurance of the cylindrical member is 2,500 or more at a stress of 100 MPa".

JP2004-075753A discloses "a tubular polyimide molded article that is a cylindrical molded article containing a polyimide resin and has a thickness of 60 to 100 μm, in which the number of times of bending endurance of the tubular polyimide molded article measured by an MIT test specified in JIS P8115 is 5.0×103 or more".

SUMMARY

Aspects of non-limiting embodiments of the present disclosure relate to an endless belt which contains a resin and conductive particles and in which a content of the conductive particles with respect to the endless belt is 5% by volume or more and 20% by volume or less in terms of a volume ratio, the endless belt having higher durability while satisfying electrical characteristics, compared to an endless belt which has a Young's modulus less than 3,000 MPa and has the number of times of bending endurance less than 10,000 measured by an MIT test specified in JIS P8115: 2001.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above problems include the following aspect.

According to an aspect of the present disclosure, there is provided an endless belt that contains a resin and conductive particles, in which a content of the conductive particles with respect to the endless belt is 5% by volume or more and 20% by volume or less in terms of a volume ratio, a Young's modulus of the endless belt is 3,000 MPa or more, and the number of times of bending endurance of the endless belt measured by an MIT test specified in JIS P8115: 2001 is 10,000 or more.

BRIEF DESCRIPTION OF THE DRAWINGS

Exemplary embodiment(s) of the present invention will be described in detail based on the following figures, wherein.

DETAILED DESCRIPTION

Figure 1:
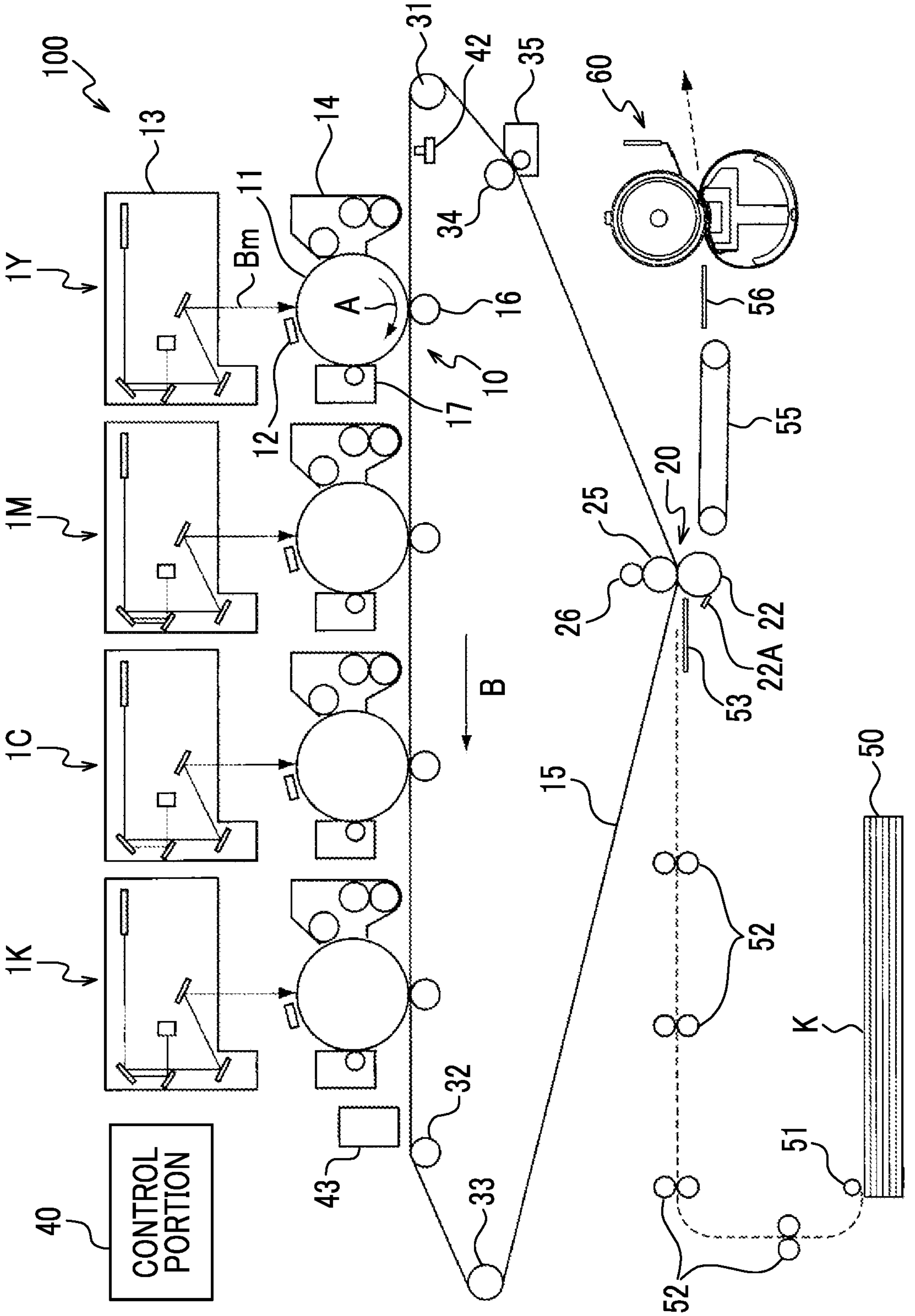
FIG. 1 is a schematic configuration view showing an example of an image forming apparatus according to the present exemplary embodiment.

Hereinafter, the present exemplary embodiment as an example of the present invention will be described. The following descriptions and examples merely illustrate exemplary embodiments, and do not limit the scope of the exemplary embodiments.

Regarding the ranges of numerical values described in stages in the present exemplary embodiment, the upper limit or lower limit of a range of numerical values may be replaced with the upper limit or lower limit of another range of numerical values described in stages. Furthermore, in the present exemplary embodiment, the upper limit or lower limit of a range of numerical values may be replaced with values described in examples.

In the present exemplary embodiment, the term "step" includes not only an independent step but a step which is not clearly distinguished from other steps as long as the intended goal of the step is achieved.

In the present exemplary embodiment, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present exemplary embodiment, each component may include a plurality of corresponding substances. In a case where the amount of each component in a composition is mentioned in the present exemplary embodiment, and there are two or more substances corresponding to each component in the composition, unless otherwise specified, the amount of each component means the total amount of two or more substances present in the composition.

Endless Belt

The endless belt according to the present exemplary embodiment contains a resin and conductive particles, in which a content of the conductive particles with respect to the endless belt is 5% by volume or more and 20% by volume or less in terms of a volume ratio.

A Young's modulus of the endless belt according to the present exemplary embodiment is 3,000 MPa or more, and the number of times of bending endurance of the endless belt according to the present exemplary embodiment that is measured by an MIT test specified in JIS P8115:2001 is 10,000 or more.

In the related art, for the electrical characteristics (for example, discharge suppression or the like) of an endless belt, conductive particles are highly dispersed such that the content of the conductive particles with respect to the endless belt is increased to 5% by volume or more and 20% by volume or less in terms of a volume ratio.

Although the electrical characteristics of the endless belt are improved in this way, the increase in content of the conductive particles leads to deterioration of toughness and deterioration of folding resistance.

On the other hand, in the endless belt according to the present exemplary embodiment, even though the content of the conductive particles is increased to 5% by volume or more and 20% by volume or less in terms of a volume ratio, the Young's modulus and the number of times of bending endurance measured by the MIT test are within the above ranges. Therefore, the endless belt according to the present exemplary embodiment has excellent durability while satisfying electrical characteristics.

Hereinafter, the endless belt according to the present exemplary embodiment will be specifically described.

Young's Modulus

The Young's modulus of the endless belt according to the present exemplary embodiment is 3,000 MPa or more. From the viewpoint of improving durability, the Young's modulus of the endless belt is, for example, preferably 3,100 MPa or more, and more preferably 3,300 MPa or more.

The Young's modulus of the endless belt is adjusted, for example, by the type of resin and the weight-average molecular weight of the resin.

The method of measuring the Young's modulus of the endless belt is as follows.

By using a tensile tester (MODEL-1605N, manufactured by Aikoh Engineering Co., Ltd.), the endless belt is cut into a 80 mm×5 mm test piece such that the circumferential direction of the endless belt becomes a long side, the length of the test piece between chuck jigs is set to 40 mm, and a test is performed at a tensile rate of 20 mm/min. The Young's modulus is calculated from the slope of a region (where strain ranges from 10 N to 38 N) in which the S-S curve forms a straight line.

Number of Times of Bending Endurance Measured by MIT Test

The number of times of bending endurance of the endless belt according to the present exemplary embodiment that is measured by an MIT test is 10,000 or more. From the viewpoint of improving durability, the number of times of bending endurance is, for example, preferably 11,000 or more, and more preferably 13,000 or more.

The number of times of bending endurance of the endless belt that is measured by the MIT test is adjusted, for example, by the type of resin and the weight-average molecular weight of the resin.

The method of measuring the number of times of bending endurance of the endless belt by the MIT test is as follows.

For the MIT test, an MIT tester that conforms to JIS P8115:2001 is used.

The endless belt as a measurement target is cut along the circumferential direction into a sample in the form of a strip having a width of 15 mm and a length of 200 mm. Both ends of the sample are fixed, a tensile force of 1 kgf is applied thereto, and the sample is repeatedly bent (fold) 90° to the left and right at a bend point which is a terminal with a shape having a curvature R of 0.38. At this time, the number of times of bending performed until the sample breaks is defined as the number of times of bending endurance.

Composition of Endless Belt

The endless belt according to the present exemplary embodiment contains a resin and conductive particles. Specifically, the endless belt is composed of a single resin layer containing a resin and conductive particles. As necessary, the endless belt (resin layer constituting the endless belt) may contain other known components.

Examples of the resin include a polyimide resin (PI resin), polyether ketone (PEK), polyether ether ketone (PEEK), and the like.

Among these, from the viewpoint of improving durability, for example, a polyimide resin is preferable as the resin. In a case where the polyimide resin is used, it is easy to control the Young's modulus and the number of times of bending endurance measured by the MIT test of the endless belt within the above ranges.

Examples of the polyimide resin include an imidized polyamic acid (polyimide resin precursor) which is a polymer of a tetracarboxylic acid dianhydride and a diamine compound.

Examples of the polyimide resin include a resin having a constitutional unit represented by General Formula (I).

General Formula (I)

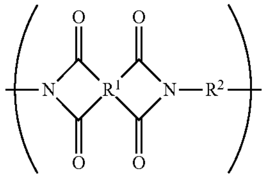

In General Formula (I), R' represents a tetravalent organic group, and R 2 represents a divalent organic group.

Examples of the tetravalent organic group represented by R' include an aromatic group, an aliphatic group, a cyclic aliphatic group, a group obtained by combining an aromatic group and an aliphatic group, and a group obtained by the substitution of these. Specific examples of the tetravalent organic group include a residue of a tetracarboxylic acid dianhydride which will be described later.

Examples of the divalent organic group represented by R 2 include an aromatic group, an aliphatic group, a cyclic aliphatic group, a group obtained by combining an aromatic group and an aliphatic group, and a group obtained by the substitution of these. Specific examples of the divalent organic group include a residue of a diamine compound which will be described later.

Specifically, examples of the tetracarboxylic acid dianhydride used as a raw material of the polyimide resin include a pyromellitic acid dianhydride, a 3,3',4,4'-benzophenone tetracarboxylic acid dianhydride, a 3,3',4,4'-biphenyltetracarboxylic acid dianhydride, a 2,3,3',4-biphenyltetracarboxylic acid dianhydride, a 2,3,6,7-naphthalenetetracarboxylic acid dianhydride, a 1,2,5,6-naphthalenetetracarboxylic acid dianhydride, a 1,4,5,8-naphthalenetetracarboxylic acid dianhydride, a 2,2'-bi s(3,4-dicarboxyphenyl)sulfonic acid dianhydride, a perylene-3,4,9,10-Tetracarboxylic acid dianhydride, a bi s(3,4-di carb oxyphenyl)ether dianhydride, and an ethylenetetracarboxylic acid dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diamin onaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino tert-butyl)toluene, bis(p-β-amino-tert-butylphenyl)ether, bis (p-β-methyl-δ-aminophenyl)benzene, bis-p-(1,1-dimethyl-5-amino-pentyl) benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylenediamine, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$, and the like.

Examples of the polyamide-imide resin include a resin having an imide bond and an amide bond in a repeating unit.

More specifically, examples of the polyamide-imide resin include a polymer of a trivalent carboxylic acid compound (also called a tricarboxylic acid) having an acid anhydride group and a diisocyanate compound or a diamine compound.

As the tricarboxylic acid, for example, a trimellitic acid anhydride and a derivative thereof preferable. In addition to the tricarboxylic acid, a tetracarboxylic acid dianhydride, an aliphatic dicarboxylic acid, an aromatic dicarboxylic acid, or the like may also be used.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-di ethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has the same structure as the aforementioned isocyanate and has an amino group instead of an isocyanato group.

Weight-Average Molecular Weight of Resin

The weight-average molecular weight of the resin is, for example, preferably 125,000 or more, more preferably 130,000 or more, and even more preferably 135,000 or more.

In a case where the weight-average molecular weight of the resin in the above range, it is easy to control the Young's modulus and the number of times of bending endurance measured by the MIT test of the endless belt within the above ranges while improving the electrical characteristics of the endless belt, and the durability is improved. As the reason, presumably, the increase in the weight-average molecular weight of the resin may reduce the frequency of microscopic breakage, which may result in the improvement of durability.

The method of measuring the weight-average molecular weight of the resin is as follows.

The resin is dissolved in a strongly basic solvent. Then, by using the solution, the weight-average molecular weight of the resin is measured by gel permeation chromatography (GPC) under the following measurement conditions.

Column: Tosoh TSKgel-M (7.8 mm ID×30 cm)

Eluent: DMF (dimethylformamide)/30 mM LiBr/60 mM phosphoric acid

Flow rate: 0.6 ml/min

Injection amount: 60 μL

Detector: RI (differential refractive index detector)

Resin Content

From the viewpoint of improving electrical characteristics and improving durability, the content of the resin with respect to the endless belt (resin layer constituting the endless belt) is, for example, preferably 60% by volume or more and 95% by volume or less, more preferably 70% by volume or more and 90% by volume or less, and even more preferably 75% by volume and 90% by volume or less, in terms of a volume ratio.

Examples of the conductive particles include conductive carbon particles, metal oxide particles, and the like.

Examples of the conductive carbon particles include carbon black.

Examples of the carbon black include Ketjen black, oil furnace black, channel black, and acetylene black. As the carbon black, carbon black having undergone a surface treatment (hereinafter, also called "surface-treated carbon black") may be used.

The surface-treated carbon black is obtained by adding, for example, a carboxy group, a quinone group, a lactone group, or a hydroxy group to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

Examples of the metal oxide particles include tin oxide particles, titanium oxide particles, zinc oxide particles, zirconium oxide particles, and the like.

Examples of the conductive particles include metal particles (for example, aluminum particles, nickel particles, and the like), ionic conductive particles (for example, potassium titanate particles, LiCl particles, and the like), and the like.

Among these, from the viewpoint of improving electrical characteristics, for example, carbon black is preferable as the conductive particles.

As the conductive particles, for example, spherical conductive particles are preferable.

Specifically, the aspect ratio of the conductive particles is, for example, preferably 2 or less, more preferably 1.8 or less, and even more preferably 1.5 or less.

In a case where the shape of the conductive particles is spherical, and the spherical conductive particles are used, compared to a case where a needle-like conductive particles are used, it is easier to control the Young's modulus and the number of times of bending endurance measured by the MIT test of the endless belt within the above ranges while improving the electrical characteristics of the endless belt, and the durability is further improved. As the reason, presumably, the aggregation of the spherical particles may be suppressed, which may reduce the number of starting points of breakage.

The aspect ratio of the conductive particles means a ratio of a major axis length to a minor axis length (major axis length/minor axis length).

The major axis length of the conductive particles means the maximum length of the conductive particles.

The minor axis length of the conductive particles means the length of the longest axis among the axes in a direction orthogonal to an extension of the major axis of the conductive particles.

The aspect ratio of the conductive particles is an average of aspect ratios of 100 conductive particles obtained using a scanning electron microscope.

The average primary particle size of the conductive particles is, for example, preferably 8 nm or more and 25 nm or less, more preferably 8 nm or more and 13 nm or less, and even more preferably 8 nm or more and 11 nm or less.

In a case where the average primary particle size of the conductive particles is in the above range, it is easy to control the Young's modulus and the number of times of bending endurance measured by the MIT test of the endless belt within the above ranges while improving the electrical characteristics of the endless belt, and the durability is improved. The reason is presumed as follows. In a case where the particles have a small particle size, even though a small amount of the particles are added, the controllability of electrical characteristics is improved. Furthermore, in a case where the particles have a small particle size, the dispersibility of the particles in a resin is improved. Because the dispersibility of the particles in a resin is improved, and the amount of hard filler components with respect to the resin is reduced, bending resistance is improved.

The method of measuring the average primary particle size of the conductive particles is as follows.

First, by a microtome, a measurement sample having a thickness of 100 nm is collected from the endless belt (resin layer constituting the endless belt) and observed with a transmission electron microscope (TEM). Then, the diameters of circles each having an area equivalent to the projected area of each of 50 primary particles of the conductive particles (that is, equivalent circle diameters) are adopted as particle sizes, and the average thereof are adopted as the average primary particle size of the conductive particles.

The content of the conductive particles with respect to the endless belt (resin layer constituting the endless belt) is 5% by volume or more and 20% by volume or less in terms of a volume ratio. From the viewpoint of improving electrical characteristics and improving durability, the content of the conductive particles is, for example, preferably 5% by volume or more and 15% by volume or less, and more preferably 5% by volume or more and 12% by volume or less.

Other Components

Examples of other components include a filler for improving mechanical strength, an antioxidant for preventing thermal deterioration of a belt, a surfactant for improving fluidity, a heat-resistant antioxidant, and the like.

In a case where the resin layer contains other components, the content of the other components with respect to the resin layer is, for example, preferably more than 0% by mass and 10% by mass or less, more preferably more than 0% by mass and 5% by mass or less, and even more preferably more than 0% by mass and 1% by mass or less.

Thickness of Endless Belt

The thickness of the endless belt (resin layer constituting the endless belt) is, for example, preferably 60 μm or more and 120 μm or less, and more preferably 60 μm or more and 110 μm or less.

The thickness of the endless belt is measured as follows. That is, a cross section of the endless belt taken along the thickness direction is observed with an optical microscope or a scanning electron microscope, the thickness of the endless belt as a measurement target is measured at 10 sites, and the average thereof is adopted as the thickness.

Manufacturing Method of Endless Belt

The manufacturing method of the endless belt according to the present exemplary embodiment has, for example, a step of coating a surface of a mold with a resin solution containing a resin or a resin precursor and conductive particles to form a coating film,

- a step of heating and drying the coating film and, as necessary, reacting the precursor (for example, imidization in a case where the precursor is a polyimide resin precursor) to form a resin film,
- a step of removing the resin film from the mold, and
- a step of performing an ultraviolet irradiation treatment or an excimer laser irradiation treatment on a surface of the resin film (that is, an outer peripheral surface) before or after the resin film is removed from the mold.

The resin film removed from the mold is adopted as an endless belt.

Although the mold is not particularly limited, a cylindrical mold is preferably used. The substrate may be a metal substrate. Instead of the metal mold, molds made of other materials such as a resin, glass, and ceramics may also be used. Furthermore, a glass coat, a ceramic coat, or the like may be provided on the surface of the mold, or the mold may be coated with a silicone-based or fluorine-based release agent.

Examples of the method of applying the resin solution include the usual methods such as a blade coating method, a wire bar coating method, a spray coating method, a dip coating method, a bead coating method, an air knife coating method, and a curtain coating method.

Use of Endless Belt

The endless belt according to the present exemplary embodiment can be used, for example, as an endless belt for an electrophotographic image forming apparatus. Examples of the endless belt for the electrophotographic image forming apparatus include an intermediate transfer belt, a transfer belt (that is, a recording medium transport belt), a fixing belt (such as a heating belt or a pressing belt), a transport belt (that is, a recording medium transport belt), and the like.

The endless belt according to the present exemplary embodiment can also be used, for example, as a belt-like member, such as a transport belt, a driving belt, a laminated belt, an electric insulating material, a pipe coating material, an electromagnetic wave insulating material, a heat source insulator, or an electromagnetic wave absorbent film, in addition to the endless belt for an image forming apparatus.

Depending on the use, the endless belt according to the present exemplary embodiment may include a functional layer provided on the outer peripheral surface side or the inner peripheral surface side. Here, the endless belt according to the present exemplary embodiment may be used, for example, as a resin substrate layer.

Transfer Device

The transfer device according to the present exemplary embodiment includes an intermediate transfer belt that has an outer peripheral surface to which a toner image is to be transferred, a primary transfer device that has a primary transfer member performing primary transfer of a toner image formed on a surface of an image holder to the outer peripheral surface of the intermediate transfer belt, and a secondary transfer device that has a secondary transfer member that is arranged in contact with the outer peripheral surface of the intermediate transfer belt and performs secondary transfer of the toner image transferred to the outer peripheral surface of the intermediate transfer belt to a surface of a recording medium.

As the intermediate transfer belt, an intermediate transfer belt having the endless belt according to the present exemplary embodiment is used.

The transfer device according to the present exemplary embodiment may include a known device such as a cleaning device having a cleaning member that cleans the outer peripheral surface of the intermediate transfer belt.

Intermediate Transfer Belt

The intermediate transfer belt has the aforementioned endless belt according to the present exemplary embodiment.

The intermediate transfer belt may be a single layer composed of the endless belt or may be a laminate in which the endless belt and a resin substrate layer are laminated. The laminate may be, for example, a laminate having a resin substrate layer, an elastic layer provided on the resin substrate layer, and a release layer provided on the elastic layer, or a laminate having a resin substrate layer and a release layer provided on the resin substrate layer.

The elastic layer will be described.

The elastic layer is composed of a heat-resistant elastic material.

Examples of the heat-resistant elastic material include silicone rubber, fluororubber, and the like.

Examples of the silicone rubber include room temperature vulcanizing (RTV) silicone rubber, high temperature vulcanizing (HTV) silicone rubber, liquid silicone rubber, and the like. Specific examples thereof include polydimethyl silicone rubber, methylvinyl silicone rubber, methylphenyl silicone rubber, fluorosilicone rubber, and the like.

Examples of the fluororubber include vinylidene fluoride-based rubber, ethylene tetrafluoride/propylene-based rubber, ethylene tetrafluoride/perfluoromethylvinyl ether rubber, phosphazene-based rubber, fluoropolyether, and the like.

The elastic layer may contain other components. Examples of the other components include a fillers, a conducting agent, a softener (such as a paraffin-based softener), a processing aid (such as stearic acid), an antioxidant (such as an amine-based antioxidant), a vulcanizing agent (such as sulfur, a metal oxide, or a peroxide), a functional filler (such as alumina), and the like.

The release layer will be described.

The release layer contains, for example, a heat-resistant release material.

Examples of the heat-resistant release material include fluororubber, a fluororesin, a silicone resin, a polyimide resin, and the like.

Among these, for example, a fluororesin is preferable as the heat-resistant release material. Specific examples of the fluororesin include a tetrafluoroethylene/perfluoroalkylvinyl ether copolymer (PFA), polytetrafluoroethylene (PTFE), a tetrafluoroethylene/hexafluoropropylene copolymer (FEP), a polyethylene/tetrafluoroethylene copolymer (ETFE), polyvinylidene fluoride (PVDF), polychlorotrifluoroethylene (PCTFE), vinyl fluoride (PVF), and the like.

The intermediate transfer belt adopts a known configuration, except for the endless belt according to the present exemplary embodiment.

Volume Resistivity of Intermediate Transfer Belt

The common logarithm of the volume resistivity that the intermediate transfer belt has in a case where a voltage of 100 V is applied thereto for 10 seconds is, for example, 8.0 (log Ω·cm) or more and 13.5 (log Ω·cm) or less, and more preferably 8.5 (log Ω·cm) or more and 13.2 (log Ω·cm) or less.

The volume resistivity that the intermediate transfer belt has in a case where a voltage of 100 V is applied thereto for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the volume resistivity (log Ω·cm) is measured at a total of 18 spots in the intermediate transfer belt, 6 spots at equal intervals in the circumferential direction and 3 spots in the central portions and both end portions in the width direction, at a voltage of 100 V under a pressure of 1 kgf for a voltage application time of 10 seconds, and the average thereof is calculated. The volume resistivity is measured in an environment of a temperature of 22° C. and a humidity of 55% RH.

Surface Resistivity of Intermediate Transfer Belt

The common logarithm of the surface resistivity that the intermediate transfer belt has in a case where a voltage of 100 V is applied to the outer peripheral surface thereof for 10 seconds is, for example, preferably 9.5 (log Ω/suq.) or more 15.0 (log Ω/suq.) or less, more preferably 10.5 (log Ω/suq.) or more and 14.0 (log Ω/suq.) or less, and particularly preferably 11.0 (log Ω/suq.) or more and 13.5 (log Ω/suq.) or less.

The unit of the surface resistivity, log Ω/suq, expresses the surface resistivity in a logarithm of resistance per unit area, which is also written as log(Ω/suq.), log Ω/suquare, log Ω/□, or the like.

The surface resistivity that the intermediate transfer belt has in a case where a voltage of 100 V is applied to the outer peripheral surface thereof for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the surface resistivity (log Ω/suq.) of the outer peripheral surface of the intermediate transfer belt is measured at a total of 18 spots within the outer peripheral surface of the intermediate transfer belt, 6 spots at equal intervals in the circumferential direction and 3 spots in the central portions and both end portions in the width direction, at a voltage of 100 V under a pressure of 1 kgf for a voltage application time of 10 seconds, and the average thereof is calculated. The surface resistivity is measured in an environment of a temperature of 22° C. and a humidity of 55% RH.

Primary Transfer Device

In the primary transfer device, the primary transfer member is arranged to face the image holder across the intermediate transfer belt. In the primary transfer device, by the primary transfer member, a voltage with polarity opposite to charging polarity of a toner is applied to the intermediate transfer belt, such that primary transfer of a toner image to the outer peripheral surface of the intermediate transfer belt is performed.

Secondary Transfer Device

In the secondary transfer device, the secondary transfer member is arranged on a toner image-holding side of the intermediate transfer belt. The secondary transfer device includes, for example, a secondary transfer member and a back surface member that is arranged on the side opposite to the toner image-holding side of the intermediate transfer belt. In the secondary transfer device, the intermediate transfer belt and the recording medium are interposed between the secondary transfer member and the back surface member, and a transfer electric field is formed. In this way, secondary transfer of the toner image formed on the intermediate transfer belt to the recording medium is performed.

The secondary transfer member may be a secondary transfer roll or a secondary transfer belt. As the back surface member, for example, a back roll is used.

Cleaning Device

In the cleaning device, the cleaning member is arranged on a toner image-holding side of the intermediate transfer belt. The cleaning device includes, for example, the cleaning member and a back surface member that is arranged on the side opposite to the toner image-holding side of the intermediate transfer belt. In the cleaning device, for example, in a state where the intermediate transfer belt is interposed between the cleaning member and the back surface member, the cleaning member cleans the outer peripheral surface of the intermediate transfer belt.

Examples of the cleaning member include a cleaning blade and a cleaning brush.

The transfer device according to the present exemplary embodiment may be a transfer device that transfers a toner image to the surface of a recording medium via a plurality of intermediate transfer members. That is, the transfer device may be, for example, a transfer device of performing primary transfer of a toner image to a first intermediate transfer member from an image holder, performing secondary transfer of the toner image to a second intermediate transfer member from the first intermediate transfer member, and then performing tertiary transfer of the toner image to a recording medium from the second intermediate transfer member.

As at least one of the plurality of intermediate transfer members of the transfer device, the intermediate transfer belt having the aforementioned endless belt according to the present exemplary embodiment is used.

Image Forming Apparatus

The image forming apparatus according to the present exemplary embodiment includes a toner image forming device that forms a toner image on a surface of an image holder and a transfer device that transfers the toner image formed on the surface of the image holder to a surface of a recording medium. As the transfer device, the transfer device according to the present exemplary embodiment described above is used.

Examples of the toner image forming device include a device including an image holder, a charging device that charges the surface of the image holder, an electrostatic latent image forming device that forms an electrostatic latent image on the surface of the charged image holder, and a developing device that develops the electrostatic latent image formed on the surface of the image holder with a developer containing a toner to form a toner image.

As the image forming apparatus according to the present exemplary embodiment, known image forming apparatuses are used that include an apparatus including a fixing unit that fixes a toner image transferred to the surface of a recording medium; an apparatus including a cleaning unit that cleans the surface of an image holder not yet being charged after transfer of a toner image; an apparatus including an electricity removing unit that removes electricity by irradiating the surface of an image holder, the image holder not yet being charged, with electricity removing light after transfer of a toner image; an apparatus including an image holder heating member that raises the temperature of an image holder to reduce relative temperature, and the like.

The image forming apparatus according to the present exemplary embodiment may be either an image forming apparatus for a dry developing method or an image forming apparatus for a wet developing method (developing method using a liquid developer).

In the image forming apparatus according to the present exemplary embodiment, for example, a portion including the image holder may be a cartridge structure (process cartridge) detachable from the image forming apparatus. As the process cartridge, for example, a process cartridge including a toner image forming device and a transfer device is preferably used.

Hereinafter, an example of the image forming apparatus according to the present exemplary embodiment will be described with reference to drawings. Here, the image forming apparatus according to the present exemplary embodiment is not limited thereto. Hereinafter, among the parts shown in the drawing, main parts will be described, and others will not be described.

Image Forming Apparatus

FIG. 1 is a schematic configuration view showing the configuration of the image forming apparatus according to the present exemplary embodiment.

As shown in FIG. 1, an image forming apparatus 100 according to the present exemplary embodiment is, for example, an intermediate transfer-type image forming apparatus that is generally called a tandem type, and includes a plurality of image forming units 1Y, 1M, 1C, and 1K (an example of a toner image forming device) in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control portion 40 that controls the operation of each device (each portion).

Each of the image forming units 1Y, 1M, 1C, and 1K of the image forming apparatus 100 includes a photoreceptor 11 (an example of an image holder) that holds the toner image formed on the surface thereof and rotates in the direction of an arrow A.

As an example of a charging unit, a charger 12 for charging the photoreceptor 11 is provided around the photoreceptor 11. As an example of a latent image forming unit, a laser exposure machine 13 that draws an electrostatic latent image on the photoreceptor 11 is provided (in FIG. 1, an exposure beam is represented by a mark Bm).

Around the photoreceptor 11, as an example of a developing unit, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black from the upstream side of the intermediate transfer belt 15.

By various rolls, the intermediate transfer belt 15 is driven to circulate (rotate) in a direction B shown in FIG. 1 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a supporting roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided in a cleaning portion scrapping off the residual toner on the intermediate transfer belt 15.

The primary transfer portion 10 is configured with the primary transfer roll 16 that is arranged to face the photoreceptor 11 across the intermediate transfer belt 15. The primary transfer roll 16 is arranged to be pressed on the photoreceptor 11 across the intermediate transfer belt 15. Furthermore, the polarity of voltage (primary transfer bias) applied to the primary transfer roll 16 is opposite to the charging polarity (negative polarity, the same shall apply hereinafter) of the toner. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 includes the back roll 25 and a secondary transfer roll 22 that is arranged on a toner image-holding surface side of the intermediate transfer belt 15.

The back roll 25 is formed such that the surface resistivity thereof is $1\times10^{7}$ Ω/□ or more and $1\times10^{10}$Ω/□ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

On the other hand, the secondary transfer roll 22 is a cylindrical roll having a volume resistivity of $10^{7.5}$ Ωcm or more and $10^{8.5}$ Ωcm or less. The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, an intermediate transfer belt-cleaning member 35 separable from the intermediate transfer belt 15 is provided that removes the residual toner or paper powder on the intermediate transfer belt 15 remaining after the secondary transfer and cleans the outer peripheral surface of the intermediate transfer belt 15.

On the downstream side of the secondary transfer portion 20 of the secondary transfer roll 22, a secondary transfer roll-cleaning member 22A is provided that removes the residual toner or paper powder on the secondary transfer roll 22 remaining after the secondary transfer and cleans the outer peripheral surface of the intermediate transfer belt 15. Examples of the secondary transfer roll-cleaning member 22A include a cleaning blade. The secondary transfer roll-cleaning member 22A may be a cleaning roll.

The intermediate transfer belt 15, the primary transfer roll 16, the secondary transfer roll 22, and the intermediate transfer belt-cleaning member 35 correspond to an example of the transfer device.

Figure 2:
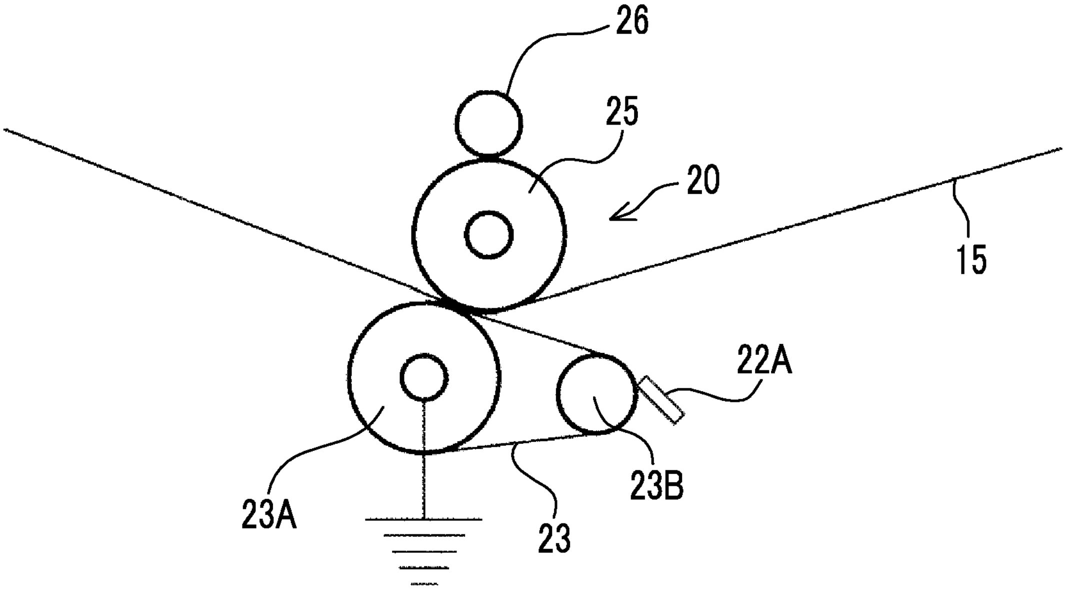
FIG. 2 is a schematic configuration view showing the periphery of a secondary transfer portion in another example of the image forming apparatus according to the present exemplary embodiment.

The image forming apparatus 100 may have a configuration in which the apparatus includes a secondary transfer belt (an example of a secondary transfer member) instead of the secondary transfer roll 22. Specifically, as shown in FIG. 2, the image forming apparatus 100 may include a secondary transfer device including a secondary transfer belt 23, a driving roll 23A that is disposed to face the back roll 25 via the secondary transfer belt 23 and the intermediate transfer belt 15, and an idler roll 23B that allows the secondary transfer belt 23 to be stretched thereon in cooperation with the driving roll 23A.

On the other hand, on the upstream side of the yellow image forming unit 1Y, a reference sensor (home position sensor) 42 is arranged that generates a reference signal to be a reference for taking the image forming timing in each of the image forming units 1Y, 1M, 1C, and 1K. On the downstream side of the black image forming unit 1K, an image density sensor 43 for adjusting image quality is arranged. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control portion 40 based on the recognition of the reference signal.

The image forming apparatus according to the present exemplary embodiment includes, as a transport unit for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

Next, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the polarity of the charging polarity (negative polarity) of the toner is applied to the substrate of the intermediate transfer belt 15, and the toner images are sequentially overlapped on the outer peripheral surface of the intermediate transfer belt 15 and subjected to primary transfer.

After the primary transfer by which the toner images are sequentially transferred to the outer peripheral surface of the intermediate transfer belt 15, the intermediate transfer belt 15 moves, and the toner images are transported to the secondary transfer portion 20. In a case where the toner images are transported to the secondary transfer portion 20, in the transport unit, the paper feeding roll 51 rotates in accordance with the timing at which the toner images are transported to the secondary transfer portion 20, and the paper K having the target size is supplied from the paper storage portion 50. The paper K supplied from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, such that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an ejection portion of the image forming apparatus.

Meanwhile, after the transfer to the paper K is finished, the residual toner remaining on the intermediate transfer belt 15 is transported to the cleaning portion as the intermediate transfer belt 15 rotates, and is removed from the intermediate transfer belt 15 by the back roll 34 for cleaning and the intermediate transfer belt-cleaning member 35.

Hitherto, the present exemplary embodiment has been described. However, the present exemplary embodiment is not limited to the above exemplary embodiments, and various modifications, changes, and ameliorations can be added thereto.

EXAMPLES

Examples of the present invention will be described below, but the present invention is not limited to the following examples. In the following description, unless otherwise specified, "parts" and "%" are based on mass in all cases.

Example 1

A solution containing a resin or a resin precursor and conductive particles (hereinafter, also called a specific solution) is prepared as follows. An N-methyl-2-pyrrolidone solution of a polyamic acid (concentration of solid content of 18% by mass after conversion of imide) consisting of 3,3',4,4'-biphenyltetracarboxylic acid dianhydride and 4,4'-diaminodiphenylether as a solution containing a resin or a resin precursor and carbon black as conductive particles (FW200 manufactured by Cabot Corporation.) are dispersed by a high-pressure collision type disperser, thereby obtaining a dispersion. This dispersion is kneaded with a polyimide varnish (JIV300H manufactured by JFE Chemical Corporation) to adjust the amount of carbon black to be 24 parts by mass with respect to 100 parts by mass of the solid content of the resin, thereby preparing a specific solution.

As a cylindrical mold, an aluminum cylinder having an outer diameter of 366 mm and a length of 600 mm is prepared. Via a dispenser, the coating liquid (that is, the specific solution) is jetted to the outer peripheral surface of the cylinder at a width of 500 mm, such that a coating film having a thickness of 80 μm is formed.

In a state where the cylinder on which the coating film is kept horizontal, the coating film is heated and dried at 140° C. for 30 minutes. The dried coating film is heated up to a maximum temperature of 320° C. for 120 minutes to form a resin film.

The resin film is peeled off from the mold by manually removing the mold. The central portion of the resin film in the axial direction is cut in a width of 363 mm, thereby obtaining an endless belt.

Example 2

The carbon black in Example 1 is changed to Special-Black4 (SB4) manufactured by Cabot Corporation., and the amount of carbon black is adjusted to be 11 parts by mass with respect to 100 parts by mass of the solid content of the resin. An endless belt is obtained in the same manner as in Example 1, except for this operation.

Example 3

The amount of carbon black in Example 1 is adjusted to be 6 parts by mass with respect to 100 parts by mass of the solid content of the resin. An endless belt is obtained in the same manner as in Example 1, except for this operation.

Example 4

The amount of carbon black in Example 1 is adjusted to be 30 parts by mass with respect to 100 parts by mass of the solid content of the resin. An endless belt is obtained in the same manner as in Example 1, except for this operation.

Example 5

The carbon black in Example 1 is changed to Sb-doped conductive tin oxide (metal oxide, manufactured by ISHIHARA SANGYO KAISHA, LTD., SN-100P), and the amount of conductive tin oxide is adjusted to be 13 parts by mass with respect to 100 parts by mass of the solid content of the resin. In addition, coating is performed such that a coating film having a thickness of 70 μm is formed. An endless belt is obtained in the same manner as in Example 1, except for this operation.

Example 6

The carbon black in Example 1 is changed to Sb-doped conductive tin oxide (metal oxide, manufactured by ISHIHARA SANGYO KAISHA, LTD., FS-10P), and the amount of conductive tin oxide is adjusted to be 13 parts by mass with respect to 100 parts by mass of the solid content of the resin. In addition, coating is performed such that a coating film having a thickness of 70 μm is formed. An endless belt is obtained in the same manner as in Example 1, except for this operation.

Example 7

The carbon black in Example 1 is changed to Emperor 2000 manufactured by Cabot Corporation., and the amount of carbon black is adjusted to be 10 parts by mass with respect to 100 parts by mass of the solid content of the resin. In addition, coating is performed such that a coating film having a thickness of 80 μm is formed. An endless belt is obtained in the same manner as in Example 1, except for this operation.

Example 8

The carbon black in Example 1 is changed to Special-Black 350 manufactured by Cabot Corporation., and the amount of carbon black is adjusted to be 10 parts by mass with respect to 100 parts by mass of the solid content of the resin. In addition, coating is performed such that a coating film having a thickness of 80 μm is formed. An endless belt is obtained in the same manner as in Example 1, except for this operation.

Example 9

PEEK (Ketaspire KT-850 manufactured by Solvay) is used as a resin, and carbon black is weighed such that the amount thereof is 21 parts by mass with respect to 100 parts by mass of the resin, and the resin and the carbon black are kneaded. By using an extrusion molding machine including a cylindrical die on the tip portion, the obtained kneaded material is molded into an endless belt having a film thickness of 65 μm.

Example 10

The coating liquid (that is, the specific solution) is applied such that the film thickness of the endless belt in Example 1 is 85 μm. An endless belt is obtained in the same manner as in Example 1, except for this operation.

Example 11

The coating liquid (that is, the specific solution) is applied such that the film thickness of the endless belt in Example 1 is 60 μm. An endless belt is obtained in the same manner as in Example 1, except for this operation.

Comparative Example 1

The solution containing a resin precursor in Example 1 is changed to a polyimide varnish (manufactured by JFE Chemical Corporation, JIV300R, solid content of 18% by mass). An endless belt is obtained in the same manner as in Example 1, except for this operation.

Comparative Example 2

The solution containing a resin precursor in Example 2 is changed to a polyimide varnish (manufactured by JFE Chemical Corporation, JIV300R, solid content of 18% by mass). An endless belt is obtained in the same manner as in Example 2, except for this operation.

Comparative Example 3

The solution containing a resin precursor in Example 2 is changed to a polyamide-imide varnish (HPC-9000F-8L, manufactured by Hitachi Chemical Company, Ltd., solid content of 13% by mass) that is a solution containing a resin. An endless belt is obtained in the same manner as in Example 1, except for this operation.

Evaluation

Characteristic Evaluation

The characteristics of the endless belt of each example are measured according to the method described above.

Young's Modulus

The number of times of bending endurance measured by the MIT test specified in JIS P8115:2001 (written as "Number of times of bending endurance" in the table).

Evaluation of Electrical Characteristics

The electrical characteristics are evaluated as follows.

An electrode is disposed in a position 60 μm spaced apart from the outer peripheral surface of the endless belt, voltage is applied to the electrode, and an integrated discharge amount for one second after the voltage reaches 1,300 V (hereinafter, also simply called "discharge amount") is measured. The local discharge suppression effect is evaluated according to the following evaluation standard. The evaluation standard is as follows. In a case where voltage is applied to the endless belt, in the event that a current flows through the electrode spaced apart from the surface of the endless belt, local discharge from the endless belt occurs.

Therefore, the lower the value of the measured current level, the further the local discharge from the endless belt is suppressed.

A: The discharge amount is less than 110 μC.

B: The discharge amount is 110 μC or more and less than 150 μC.

C: The discharge amount is 150 μC or more and less than 300 μC.

D: The discharge amount is 300 μC or more.

Durability Evaluation

The bending resistance is evaluated as follows. According to JIS P8115:2001, a sample is fixed with a clamp having a curvature R=0.38 and then evaluated using an MIT tester adopting a method of repeatedly bending the sample.

The evaluation standard is as follows.

A: The number of times of bending endurance is 15,000 or more.

B: The number of times of bending endurance is 10,000 or more.

C: The number of times of bending endurance is 3,000 or more and less than 10,000.

D: The number of times of bending endurance is 3,000 or less.

The results are shown in Table 1. Details of the abbreviations and the like in Table 1 are as follows.

PI: polyimide resin

PAI: Polyamide-imide resin

CB: carbon black

SnO2: Sb-doped conductive tin oxide

Mw: weight-average molecular weight

Particle size: average primary particle size

The above results tell that the endless belts of the present examples have higher durability while satisfying electrical characteristics, compared to the endless belts of comparative examples.

The present exemplary embodiment includes the following aspects.

(((1)))

An endless belt comprising:

a resin; and conductive particles, wherein a content of the conductive particles with respect to the endless belt is 5% by volume or more and 20% by volume or less in terms of a volume ratio, a Young's modulus of the endless belt is 3,000 MPa or more, and the number of times of bending endurance of the endless belt measured by an MIT test specified in JIS P8115:2001 is 10,000 or more.

(((2)))

The endless belt according to (((1))), wherein the resin is a polyimide resin.

(((3)))

The endless belt according to (((1))) or (((2))), wherein the resin has a weight-average molecular weight of 125,000 or more.

(((4)))

The endless belt according to (((3))), wherein the resin having a weight-average molecular weight of 125,000 or more is a polyimide resin.

TABLE 1

| | | Example 1 | Example 2 | Example 3 | Example 4 | Example 5 | Example 6 | Example 7 |
|---|---|---|---|---|---|---|---|---|
| Resin | Type | PI | PI | PI | PI | PI | PI | PI |
| | Mw | 130,000 | 130,000 | 130,000 | 130,000 | 130,000 | 130,000 | 130,000 |
| Conductive particles | Type | CB | CB | CB | CB | SnO2 | SnO2 | CB |
| | Amount (% by volume) | 9.6 | 13 | 6 | 19 | 6 | 6 | 5 |
| | Particle size (nm) | 13 | 25 | 13 | 13 | 25 | Major axis: 25 or less | 9 |
| | Aspect ratio | 1.2 | 1.3 | 1.2 | 1.2 | 1.7 | 2.1 | 1.2 |
| Characteristics of belt | Film thickness | 80 | 80 | 80 | 80 | 70 | 70 | 80 |
| | Young's modulus | 3,427 | 3,300 | 3,328 | 3,380 | 3,025 | 3,030 | 3,300 |
| | Number of times of bending endurance (times) | 20,340 | 14,500 | 18,070 | 11,200 | 10,800 | 10,100 | 16,200 |
| Evaluation | Electrical characteristics | A | B | A | B | C | C | A |
| | durability | A | B | A | B | B | B | A |

| | | Example 8 | Example 9 | Example 10 | Example 11 | Comparative Example 1 | Comparative Example 2 | Comparative Example 3 |
|---|---|---|---|---|---|---|---|---|
| Resin | Type | PI | PEEK | PI | PI | PI | PI | PAI |
| | Mw | 130,000 | 12,600 | 130,000 | 12,600 | 120,000 | 120,000 | 100,000 |
| Conductive particles | Type | CB | CB | CB | CB | CB | CB | CB |
| | Amount (% by volume) | 6 | 9 | 9.6 | 9.6 | 9.6 | 13 | 10 |
| | Particle size (nm) | 30 | 13 | 13 | 13 | 13 | 25 | 13 |
| | Aspect ratio | 1.5 | 1.2 | 1.2 | 1.2 | 1.2 | 1.5 | 1.2 |
| Characteristics of belt | Film thickness | 80 | 65 | 85 | 60 | 80 | 80 | 80 |
| | Young's modulus | 3,000 | 3,040 | 3,440 | 3,100 | 3,442 | 3,325 | 5,000 |
| | Number of times of bending endurance (times) | 11,400 | 11,000 | 12,000 | 21,000 | 8,080 | 3,440 | 2,000 |
| Evaluation | Electrical characteristics | C | C | B | B | B | B | C |
| | durability | B | B | B | A | C | D | D |

(((5)))

The endless belt according to any one of (((1))) to (((4))), wherein the conductive particles are spherical conductive particles.

(((6)))

The endless belt according to (((5))), wherein the spherical conductive particles have an aspect ratio of 2 or less.

(((7)))

The endless belt according to any one of (((1))) to (((6))), wherein the conductive particles are carbon black.

(((8)))

The endless belt according to any one of (((1))) to (((7))), wherein an average primary particle size of the conductive particles is 8 nm or more and 25 nm or less.

(((9)))

The endless belt according to (((8))), wherein the conductive particles having an average primary particle size of 8 nm or more and 25 nm or less are carbon black.

(((10)))

A transfer device comprising:

an intermediate transfer belt that has an outer peripheral surface to which a toner image is to be transferred and has the endless belt according to any one of (((1))) to (((9))), a primary transfer device that has a primary transfer member performing primary transfer of a toner image formed on a surface of an image holder to the outer peripheral surface of the intermediate transfer belt; and a secondary transfer device that has a secondary transfer member that is arranged in contact with the outer peripheral surface of the intermediate transfer belt and performs secondary transfer of the toner image transferred to the outer peripheral surface of the intermediate transfer belt to a surface of a recording medium.

(((11)))

An image forming apparatus comprising:

a toner image forming device that has an image holder and forms a toner image on a surface of the image holder; and the transfer device according to (((10))) that is a transfer device transferring the toner image formed on the surface of the image holder to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An endless belt comprising:

a resin; and conductive particles, wherein a content of the conductive particles with respect to the endless belt is 5% by volume or more and 20% by volume or less in terms of a volume ratio, a Young's modulus of the endless belt is 3,000 MPa or more, and the number of times of bending endurance of the endless belt measured by an MIT test specified in JIS P8115: 2001 is 10,000 or more.

2. The endless belt according to claim 1, wherein the resin is a polyimide resin.

3. A transfer device comprising:

an intermediate transfer belt that has an outer peripheral surface to which a toner image is to be transferred and has the endless belt according to claim 2;

a primary transfer device that has a primary transfer member performing primary transfer of a toner image formed on a surface of an image holder to the outer peripheral surface of the intermediate transfer belt; and a secondary transfer device that has a secondary transfer member that is arranged in contact with the outer peripheral surface of the intermediate transfer belt and performs secondary transfer of the toner image transferred to the outer peripheral surface of the intermediate transfer belt to a surface of a recording medium.

4. An image forming apparatus comprising:

a toner image forming device that has an image holder and forms a toner image on a surface of the image holder; and the transfer device according to claim 3 that is a transfer device transferring the toner image formed on the surface of the image holder to a surface of a recording medium.

5. The endless belt according to claim 1, wherein the resin has a weight-average molecular weight of 125,000 or more.

6. The endless belt according to claim 5, wherein the resin having a weight-average molecular weight of 125,000 or more is a polyimide resin.

7. A transfer device comprising:

an intermediate transfer belt that has an outer peripheral surface to which a toner image is to be transferred and has the endless belt according to claim 6;

a primary transfer device that has a primary transfer member performing primary transfer of a toner image formed on a surface of an image holder to the outer peripheral surface of the intermediate transfer belt; and a secondary transfer device that has a secondary transfer member that is arranged in contact with the outer peripheral surface of the intermediate transfer belt and performs secondary transfer of the toner image transferred to the outer peripheral surface of the intermediate transfer belt to a surface of a recording medium.

8. A transfer device comprising:

an intermediate transfer belt that has an outer peripheral surface to which a toner image is to be transferred and has the endless belt according to claim 5;

a primary transfer device that has a primary transfer member performing primary transfer of a toner image formed on a surface of an image holder to the outer peripheral surface of the intermediate transfer belt; and a secondary transfer device that has a secondary transfer member that is arranged in belt to a surface of a recording medium.

9. The endless belt according to claim 1, wherein the conductive particles are spherical conductive particles.

10. The endless belt according to claim 9, wherein the spherical conductive particles have an aspect ratio of 2 or less.

11. A transfer device comprising:

an intermediate transfer belt that has an outer peripheral surface to which a toner image is to be transferred and has the endless belt according to claim 10;

a primary transfer device that has a primary transfer member performing primary transfer of a toner image formed on a surface of an image holder to the outer peripheral surface of the intermediate transfer belt; and a secondary transfer device that has a secondary transfer member that is arranged in belt to a surface of a recording medium.

12. A transfer device comprising:

an intermediate transfer belt that has an outer peripheral surface to which a toner image is to be transferred and has the endless belt according to claim 9;

a primary transfer device that has a primary transfer member performing primary transfer of a toner image formed on a surface of an image holder to the outer peripheral surface of the intermediate transfer belt; and a secondary transfer device that has a secondary transfer member that is arranged in contact with the outer peripheral surface of the intermediate transfer belt and performs secondary transfer of the toner image transferred to the outer peripheral surface of the intermediate transfer belt to a surface of a recording medium.

13. The endless belt according to claim 1, wherein the conductive particles are carbon black.

14. A transfer device comprising:

an intermediate transfer belt that has an outer peripheral surface to which a toner image is to be transferred and has the endless belt according to claim 13;

a primary transfer device that has a primary transfer member performing primary transfer of a toner image formed on a surface of an image holder to the outer peripheral surface of the intermediate transfer belt; and a secondary transfer device that has a secondary transfer member that is arranged in contact with the outer peripheral surface of the intermediate transfer belt and performs secondary transfer of the toner image transferred to the outer peripheral surface of the intermediate transfer belt to a surface of a recording medium.

15. The endless belt according to claim 1, wherein an average primary particle size of the conductive particles is 8 nm or more and 25 nm or less.

16. The endless belt according to claim 15, wherein the conductive particles having an average primary particle size of 8 nm or more and 25 nm or less are carbon black.

17. A transfer device comprising:

an intermediate transfer belt that has an outer peripheral surface to which a toner image is to be transferred and has the endless belt according to claim 16;

a primary transfer device that has a primary transfer member performing primary transfer of a toner image formed on a surface of an image holder to the outer peripheral surface of the intermediate transfer belt; and a secondary transfer device that has a secondary transfer member that is arranged in belt to a surface of a recording medium.

18. A transfer device comprising:

an intermediate transfer belt that has an outer peripheral surface to which a toner image is to be transferred and has the endless belt according to claim 15;

a primary transfer device that has a primary transfer member performing primary transfer of a toner image formed on a surface of an image holder to the outer peripheral surface of the intermediate transfer belt; and a secondary transfer device that has a secondary transfer member that is arranged in contact with the outer peripheral surface of the intermediate transfer belt and performs secondary transfer of the toner image transferred to the outer peripheral surface of the intermediate transfer belt to a surface of a recording medium.

19. A transfer device comprising:

an intermediate transfer belt that has an outer peripheral surface to which a toner image is to be transferred and has the endless belt according to claim 1;

a primary transfer device that has a primary transfer member performing primary transfer of a toner image formed on a surface of an image holder to the outer peripheral surface of the intermediate transfer belt; and a secondary transfer device that has a secondary transfer member that is arranged in contact with the outer peripheral surface of the intermediate transfer belt and performs secondary transfer of the toner image transferred to the outer peripheral surface of the intermediate transfer belt to a surface of a recording medium.

20. An image forming apparatus comprising:

a toner image forming device that has an image holder and forms a toner image on a surface of the image holder; and the transfer device according to claim 19 that is a transfer device transferring the toner image formed on the surface of the image holder to a surface of a recording medium.

* * * * *